Feb. 26, 1935.  K. D. CHAMBERS  1,992,188
MOTOR VEHICLE HEADLIGHTING SYSTEM
Filed March 15, 1927
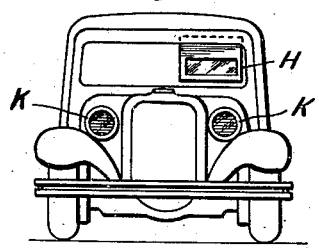
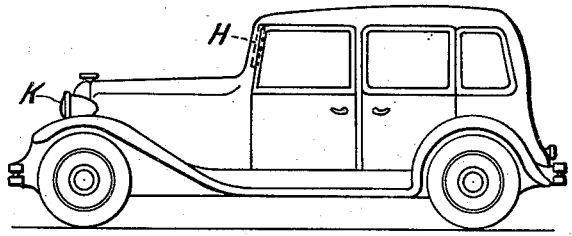
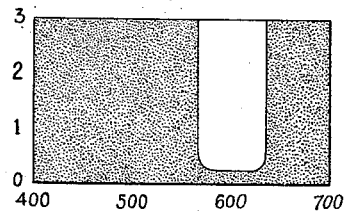
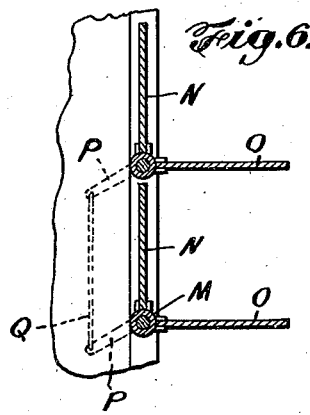
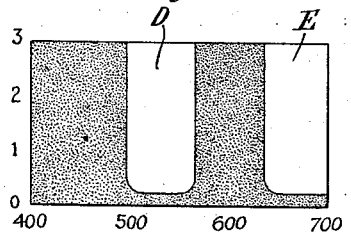
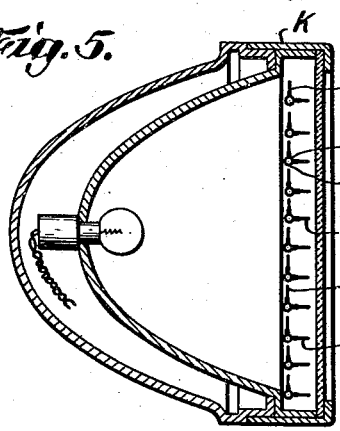
Karl D. Chambers Inventor
By his Attorneys
Prindle, Wright, Neal & Bean Patented Feb. 26, 1935

1,992,188

UNITED STATES PATENT OFFICE 1,992,188

MOTOR VEHICLE HEADLIGHTING SYSTEM

Karl D. Chambers, Montgomery, Ala.; Gertrude Steele Chambers administratrix of said Karl D. Chambers, deceased Application March 15, 1927, Serial No. 175,536

5 Claims. (Cl. 88—1)

The object of my invention has been to provide a motor vehicle, equipped with a complementary color headlighting system in accordance with my Patent No. 1,786,518 granted December 30, 1930, with selectively absorptive light filters, that have the property of each transmitting incident white light predominately on certain wave lengths and absorbing other wave lengths of the incident white light, so that the effect on the driver of the light transmitted by each filter is that of yellow, or substantially white light, and yet at the same time each driver shall be protected from any blinding caused by the headlights of the opposing vehicle.

And to such ends, my invention consists of the motor vehicle headlighting system hereinafter specified.

In my said patent, I have described motor vehicles provided with a complementary selective headlighting system, by which each of the drivers of two opposing vehicles may clearly see by his own headlight the opposing vehicle, roadway, etc., and yet at the same time be protected from any glare from the headlights of such opposing vehicle. In the system described in said patent, however, the colors of light used to form said complementary light system are different in appearance from white light, and add two more colors to those which need to be taken into account in driving a car.

My present invention obtains the same advantages, but does so with complementary lights, both of which give the effect of yellow light. Thus the situation is not complicated by the introduction of any new colors. In the accompanying drawing, Figures 1 and 2 are, respectively, the spectro-photo-metric curves of the two filters, which I use upon motor vehicles equipped with my invention. Figs. 3 and 4 are respectively front and side views of an automobile embodying my invention. Figs. 5 and 6 are respectively a vertical sectional view and an enlarged fragmentary view of an arrangement of filters for use in a headlight. The filters are designed to transmit incident white light in such a manner that the light that is passed through them will appear to be yellow, and still the light that goes through the filter of Figure 1 will be so different from the light that goes through the filter of Figure 2, so far as wave lengths are concerned, that each of them will protect an observer from light which comes through the other filter. In the application of the present invention to a motor car, a pair of filters like those shown in Figs. 1 and 2 are mounted in frames slidable up and down in a casing "H", the filter in the lower position being on a level with the driver's eyes.

Within the headlight "K", there are arranged a series of shafts "L" upon each of which is mounted a sleeve "M" having a filter "N" like the filter shown in Fig. 1, and a filter "O" like the filter shown in Fig. 2, which are set at right angles to each other. Each sleeve has an arm "P", adjacent arms being connected by a link "Q". Thus by moving any one of the links "Q" up or down, either the filter "N" or the filter "O" can be thrown into the vertical position so that the light thrown by the headlight will be yellow, and yet, by the choice of the proper filter, will be composed of waves of different lengths from those appearing in the opposing headlights.

In producing the effect, advantage is taken of the fact that yellow light; that is, light having a yellow subjective effect, is produced by the simultaneous stimulation of the retina by both red and green producing stimuli. Thus in filters, which transmit both red and green stimuli in proper proportions, the effect of yellow light is produced on the observer. The red and green bands or zones of the spectrum are, however, broad enough so that I am able to obtain a yellow light with both filters, and yet to cause each of them to refuse to transmit the light of the other by taking the red for one filter from a different portion of the red zone of the spectrum from that from which the red of the other filter is taken; and by likewise taking the green of that filter from a different portion of the green zone of the spectrum from which the green is taken for the other filter.

In the accompanying drawing, the figures on the horizontal line, 400 to 700, represent, in millimicrons, the wave lengths of light. The darkened portions of the figure represent the parts of the filters which absorb the light, and the uncolored portions of the figures represent the portions of the filters which permit the passage of light.

It will be seen that the light portion of Figure 1 (which transmits light), corresponds to the dark portion of Figure 2; and vice versa, that the light portions of Figure 2 correspond to the dark portions of Figure 1.

Thus in filter No. 1, the yellow light of the spectrum is transmitted, the undarkened portion of this filter being in the region intermediate between green and red, which shows as yellow when one looks at the spectrum.

On the other hand, the filter of Figure 2 does not transmit any yellow light, but it still produces the subjective effect of yellow light. In the unshaded portion D, green light is transmitted, while through the unshaded portion E, red light is transmitted. Thus, the filter of Figure 2, does not transmit any yellow light as such, and yet the combined effect of the green and red rays, which are transmitted, is yellow, the same as the actual yellow rays transmitted by the filter of Figure 1.

Each filter almost entirely absorbs light which is passed through the other filter, and yet the effect on the drivers of both cars and on an observer in the street is as though only ordinary yellow light were being transmitted or received.

The filter of Figure 1 transmits a narrow band of light with a maximum of approximately 590 millimicrons. This filter is made by dyeing gelatin with eosin and naphtholine green, and coating it on plates or other materials of a transparent nature, in a way well known to the art.

The filter of Figure 2 has two transmission bands and is made by coating gelatin dyed with Tartrazine on strong didymium glass. Instead of didymium glass, gelatin dyed with the proper amounts of acid rhodamine and Tartrazine may be used to produce practically the same effect.

The two filters should be planned so that the light transmitted by each of them, and coming from automobile headlamps, will be of the same subjective color.

Motor cars equipped with filters, such as I have above described, having practically the appearance of the light from ordinary headlights, would avoid being confused with the lights used in signaling for "Stop", "Go", and "Danger" purposes.

I claim:

1. In a motor vehicle, the combination of headlights, a pair of transmitting filters for each of said headlights, a pair of viewing filters for the driver, one of each of said pairs of filters being colored with eosin and naphtholine green.

2. In a motor vehicle, the combination of headlights, a pair of transmitting filters for each of said headlights, a pair of viewing filters for the driver, one of each of said pairs of filters being colored with tartrazine and didymium.

3. In a motor vehicle, the combination of headlights, a pair of transmitting filters for each of said headlights, a pair of viewing filters for the driver, one of each of said pairs of filters being colored with eosin and naphtholine green, and the other of each of said pairs of filters being colored with tartrazine.

4. In a motor vehicle, the combination of headlights, a pair of transmitting filters for each of said headlights, a pair of viewing filters for the driver, one of each of said pairs of filters being colored with eosin, and the other of each of said pairs of filters being colored with tartrazine and didymium.

5. In a motor vehicle, the combination of headlights, a pair of transmitting filters for each of said headlights, a pair of viewing filters for the driver, one of each of said pairs of filters being colored with eosin and naphtholine green, and the other of each of said pairs of filters being colored with tartrazine and didymium.

KARL D. CHAMBERS.